O. M. REIF.
BRICK MOLDING AND PRESSING MACHINE.
APPLICATION FILED MAR. 28, 1907.

910,724.

Patented Jan. 26, 1909.

3 SHEETS—SHEET 2.

WITNESSES.

INVENTOR.

O. M. REIF.
BRICK MOLDING AND PRESSING MACHINE.
APPLICATION FILED MAR. 28, 1907.
910,724.
Patented Jan. 26, 1909.
3 SHEETS—SHEET 3.
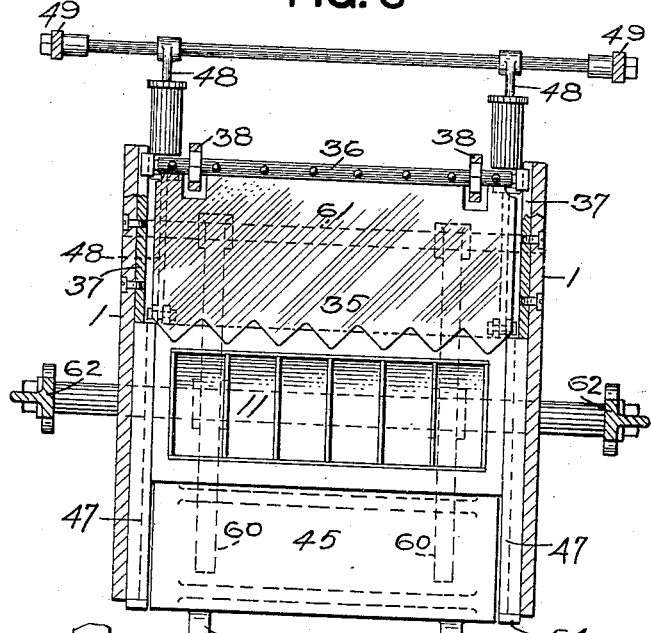
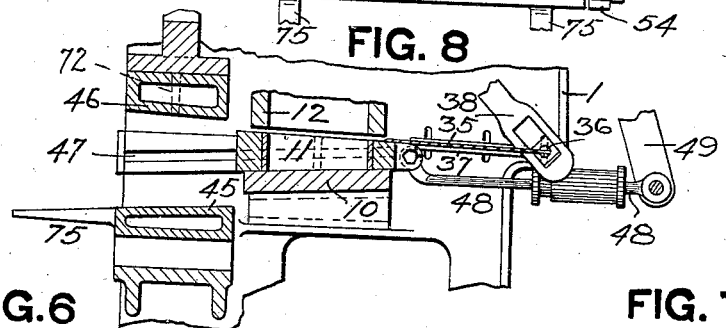
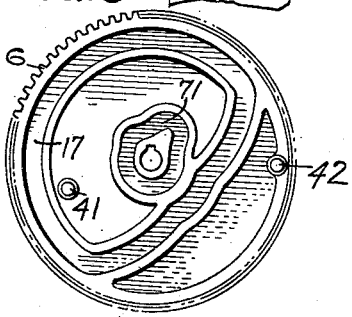
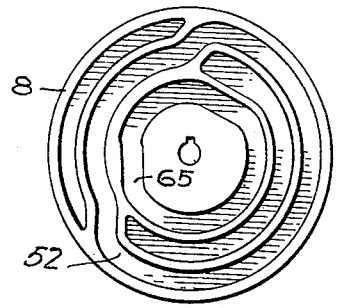
WITNESSES.
INVENTOR.

UNITED STATES PATENT OFFICE.

OTTO M. REIF, OF ALLEGHENY, PENNSYLVANIA.

BRICK MOLDING AND PRESSING MACHINE.

No. 910,724.  Specification of Letters Patent.  Patented Jan. 26, 1909.

Application filed March 28, 1907. Serial No. 365,036.

*To all whom it may concern:*

Be it known that I, OTTO M. REIF, a resident of Allegheny, in the county of Allegheny and State of Pennsylvania, have invented a new and useful Improvement in Brick Molding and Pressing Machines; and I do hereby declare the following to be a full, clear, and exact description thereof.

This invention relates to sandy and plastic block molding and pressing machines and more especially to machines for molding brick or refractory blocks.

The object of the invention is to provide automatic mechanism for both molding and re-pressing the brick or blocks in one or rapidly following operations so as not to destroy the bond, and also to automatically deliver the block or brick so as to do away with handling.

A further object is to provide a machine of this character which will produce blocks or brick of equal density and firm corners in a single operation.

The invention comprises, generally stated, automatic mechanism, including a mold, a molding plunger coöperating therewith, a re-pressing plunger, mechanism for moving the mold from the molding plunger to the re-pressing plunger, a cut-off or knife, and a feeding plunger for feeding the material to the molding plunger, said mechanisms being arranged to operate in proper sequence.

The invention also consists in providing actuating means for these mechanisms formed on a single moving body, such as cams or cam grooves formed on or in a wheel or wheels, thereby insuring all of the operations being performed exactly in their proper sequence or time, and also in the provision of suitable relief mechanism for the feeding and pressing plungers, thereby insuring feeding uniform quantities of material into the mold and cutting brick or blocks of uniform size and density.

The invention also consists in details and arrangements of mechanism hereinafter described and claimed.

Figure 1:
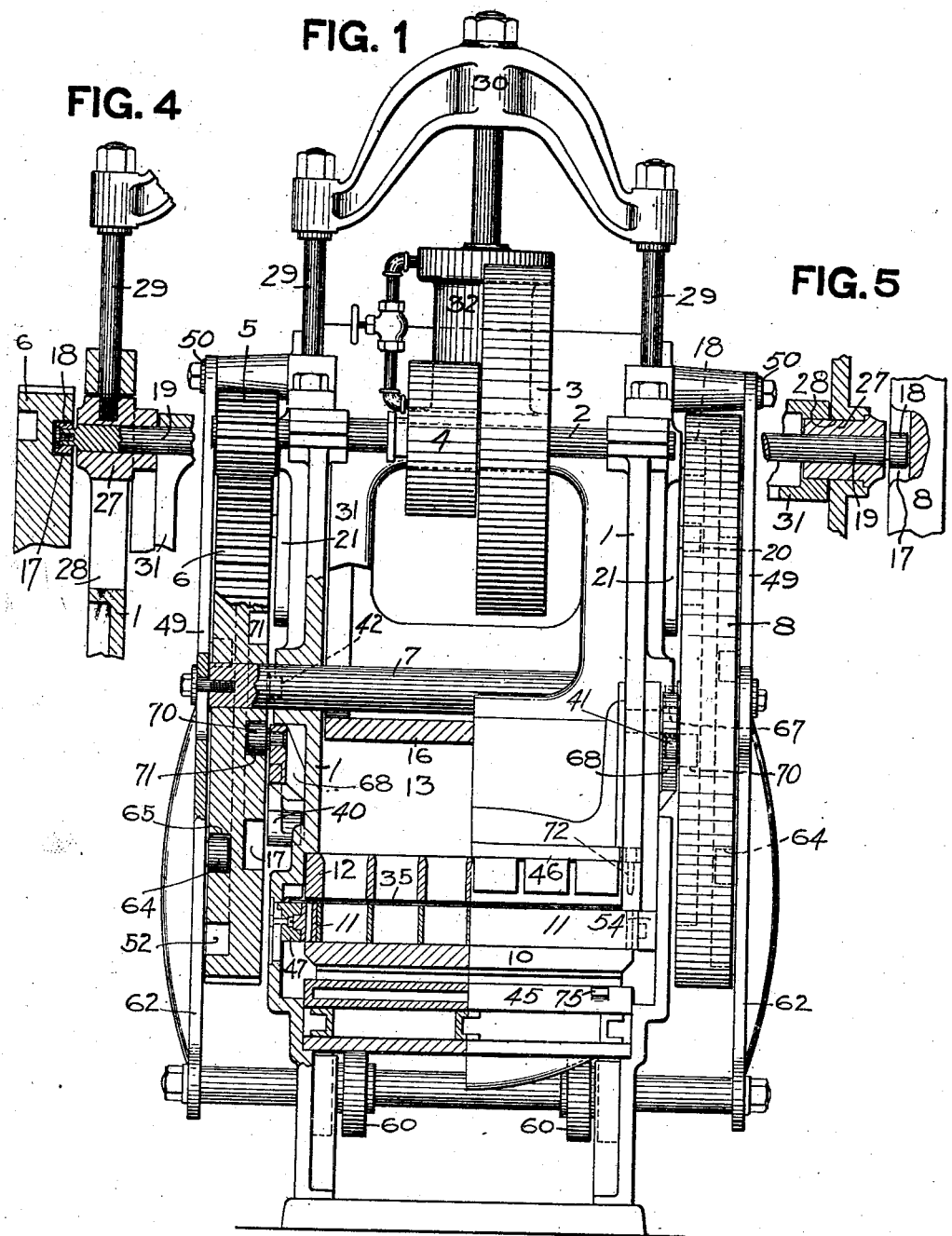
Figure 2:
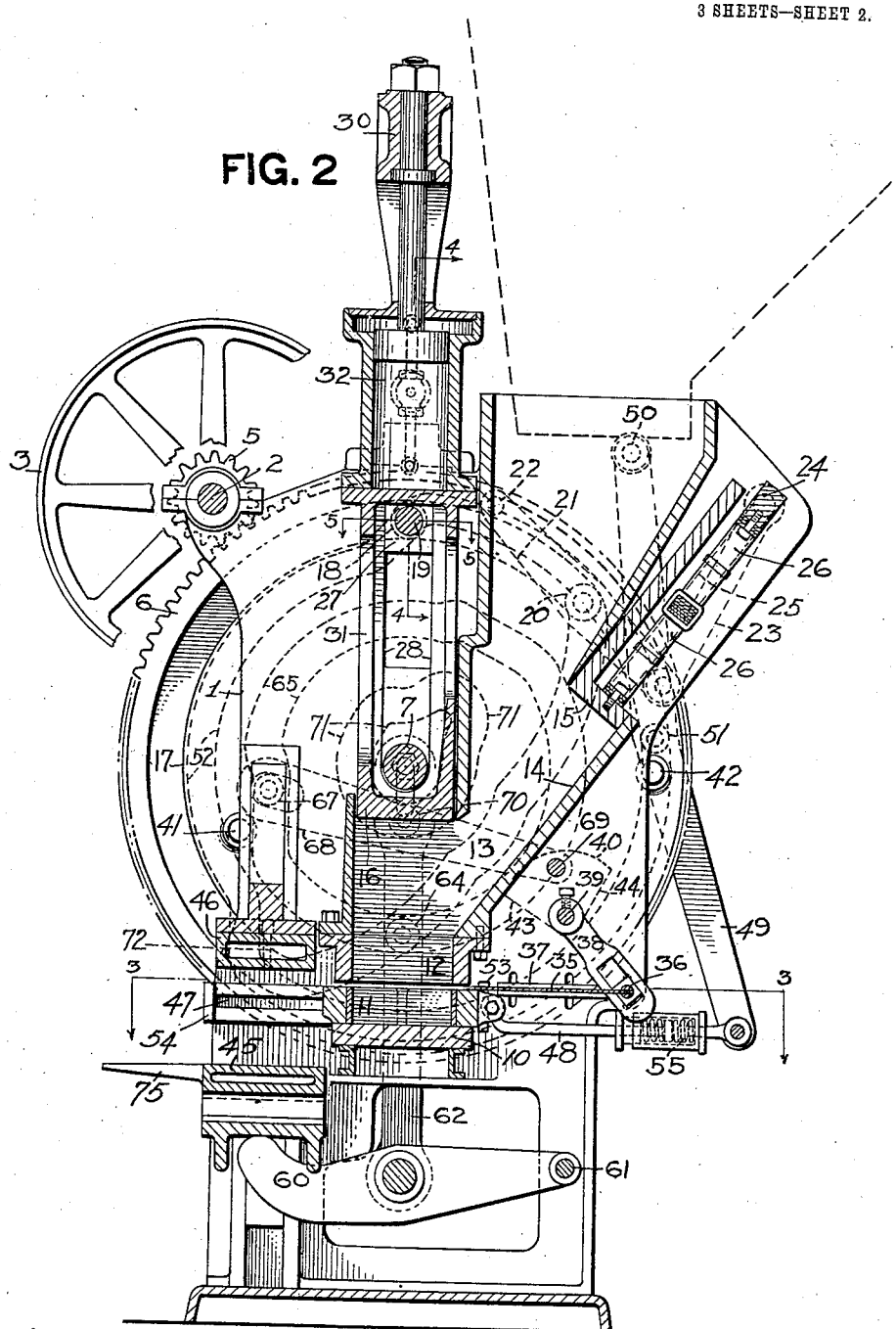

In the accompanying drawings Figure 1 is in part a front elevation and in part a vertical longitudinal section through the machine; Fig. 2 is a vertical transverse section through the machine; Fig. 3 is a horizontal section on the line 3—3 Fig. 2; Fig. 4 is a detail vertical section on the line 4—4 Fig. 2; Fig. 5 is a horizontal section on the line 5—5 Fig. 2; Fig. 6 is a view showing one side or face of a cam wheel; Fig. 7 is a similar view showing the opposite side or face; and Fig. 8 a transverse vertical section showing a modification.

The machine comprises suitable frames or housings 1 united by suitable cross-braces or connecting rods. Mounted in these housings near their tops is a driving shaft 2 provided with a pulley 3, or other suitable means for the application of the power, and a clutch 4, whereby the machine may be stopped and started.

On the driving shaft is a pinion 5 meshing with a large gear wheel 6 secured to the one end of a transverse shaft 7, mounted in the housings and having secured to its opposite end a wheel 8 corresponding in size with the gear wheel 6. Both the wheels 6 and 8 are fixed to the shaft 7 so that they rotate in unison and these wheels are provided with the cams or other means for actuating all of the moving parts of the mechanism.

Between the housings or frames is a molding or pressing plate or table 10 upon which rests the mold 11, which is open on top and bottom. Above the mold is the stationary mouth piece or funnel 12, this being located at the lower end of a hopper 13 located between the housings. The hopper has one inclined wall 14 leading down to the mouthpiece or funnel 12, and working on said inclined wall is the feeding plunger 15. Directly above the funnel or mouth-piece 12 is the molding plunger 16. Both the plungers 15 and 16 are mounted to reciprocate and the actuating mechanism, therefore, is so arranged that the feeding plunger 15 first moves downwardly to feed the material underneath the molding plunger 16, then pauses or rests while the molding plunger descends, thus holding the material in position to be forced by the molding plunger through the mouth-piece 12 into the mold 11 resting on the table 10. The mechanism for operating these plungers comprises a suitable cam groove 17 in the inner faces of the wheels 6 and 8. These cam grooves are engaged by pins or rollers 18 carried by a bar or shaft 19, to which the molding plunger 16 is connected by yielding means hereinafter described, and also by pins or rollers 20 secured to levers 21 pivoted at 22, said levers being connected by links 23 to a cross-bar or shaft 24 connected to the outer end of the feeding plunger 15 and moving in ways or slots 25 in the housings. Both of the plungers 15 and 16 are, therefore, operated from the same cam, but since their rollers or pins 18 and 20 are positioned at different points circumferentially of the cam, the plungers, while having the same movements, will move the one slightly in advance of the other. In order to prevent breakage of these parts, and also to insure the same density of material in the molds, both the plungers 15 and 16 are provided with suitable relief mechanism. The feeding plunger 15 is connected to the cross-bar or shaft 24 through interposed elliptic compression springs 26. The plunger 16 is also connected to the bar or shaft 19 by means of suitable yielding mechanism. As shown the bar 19 projects through slots in the plunger frame or body 31 and has connected thereto heads 27, moving in ways 28 in the housings and connected by rods 29 to a cross head 30. Between this cross head 30 and the plunger frame or body 31 is suitable yielding means, such as the fluid cylinder 32 connected to the plunger frame 31 and having its piston connected to the cross head and provided with a controllable by-pass or other means for permitting the fluid to be diminished or compressed. The yielding means will be adjusted to give the proper density to the material and consequently the plungers advance until the material has reached the proper density and then pause, due to the yielding of these means.

The material is cut off between the funnel 12 and mold 11 by means of a reciprocating knife or cutter 35, secured to a bar 36 which is guided in suitable ways 37 adjustably connected to the housings. The knife has a serrated cutting edge as shown in Fig. 3. This knife is arranged to pass between the funnel and mold and is operated by an arm or arms 38 having slotted connections with the knife bar 36 and secured to a rock shaft or shafts 39, said rock shafts also having secured thereto segments 40, one such segment being located on each side of the machine. Projecting from the inner faces of each of the wheels 6 and 8 are a pair of pins 41 and 42, the former being located nearer the center of the wheels than the later. In the rotation of the wheels the pins 41 first come in contact with one face 43 of the segments, thus rocking the segments and the shaft 39, and thrusting the knife forwardly to cut off the clay or other material, while in the further rotation of the wheels the pins 42 engage the opposite face 44 of the segments and rock the shaft 39 in an opposite direction, thus returning the knife to normal position.

The re-pressing is performed by the table or platen 45 and plunger 46, the mold 11 after being cut off being moved forwardly and brought between the re-pressing table and plunger. For this purpose the mold is guided on suitable ways 47 on the housings and is moved by the rod 48 which is engaged by a lever or levers 49, pivoted at 50, to the housings and provided with pins or rollers 51 running in cam grooves 52, formed in the outer faces of wheels 6 and 8. In order that the mold may be accurately positioned, both under the funnel or mouth piece and under the re-pressing plunger, even though the actuating mechanism should wear, I provide two stops 53 and 54 against which the mold contacts and is thereby brought accurately to position. To prevent straining the actuating mechanism, due to these stops, a suitable relief is provided, this relief being formed by the spiral spring 55 interposed between sections of the rod 48.

The re-pressing table or platen 45 is raised and lowered by means of levers 60 pivoted to the housings at 61, and having connected thereto the links or rods 62, which at their upper ends are slotted and guided by the ends of the shaft 7, said links being provided with pins or rollers 64 which engage cam grooves 65 formed on the outer faces of the wheels 6 and 8, and so shaped as to give the proper movements and in proper time to the re-pressing table or platen.

The re-pressing plunger 46 has connected thereto by a slot and pin connection 67, levers 68 which are pivoted to the housings at 69, and which carry pins or rollers 70 engaging cam grooves 71 formed on the inner faces of the wheels 6 and 8. The re-pressing table and plunger are suitably guided by ways formed in or secured to the housings, and the plunger is further guided by pilot pins 72 which enter suitable holes in the framing or platen at the latter part of the downward movement of the plunger. Both this plunger and table are cored for the passage of steam or other heated medium, whereby they are heated so as to prevent sticking to the clay or other material. The table or platen is provided with horns or arms 75 to support a pallet. The several cams described are shaped so as to give the proper movements and in the proper sequence to the several mechanisms.

The operation of the machine is as follows: The clay, crushed silica or other material from which the plastic blocks are to be molded is fed into the hopper 13 in any suitable way. The machine being set into operation, the feeding plunger 15 first descends to force the material down underneath the molding plunger 16, then rests and holds the compacted material while the molding plunger 16 descends, forcing the material through the mouth-piece or funnel 12 into the mold 11. The knife 35 then moves inwardly, cutting the material off even with the top of the mold. The mold 11 then moves forwardly underneath the re-pressing plunger 46, the cutter meantime re-pressing pausing or resting while the filling and molding plungers recede. The re-pressing table or platen and pressing plunger then advance and the molded block is pressed between the same. The plunger 46 then pauses or rests while the table 45 is lowered a short distance so as to permit the operator to slip a pallet between said table and the mold. Both the table 45 and the pressing plunger 46 then descend in unison, the plunger forcing the brick or block out of the mold and onto the pallet, thus delivering the brick or block onto the pallet. The plunger 46 is then raised, the mold 11 returned underneath the funnel or mouth-piece 12, and the knife 35 withdrawn, after which the foregoing operations are repeated. The operator slides the pallet out upon the arms or horns 75, and the same is carried away and an empty pallet placed upon said arms or horns in position to be slipped underneath the mold at the proper time. If desired the blocks can be re-pressed directly on the pallet, which in that case is placed on the re-pressing table before the latter rises. In that case the cams for lowering the table and plunger will be so formed that both will descend simultaneously, instead of having the table descend slightly while the plunger rests as above described.

The mold and mouth-piece may be made to form either a single block or any desired number at a single operation, the drawing showing a mold for forming simultaneously six blocks or brick.

The machine described acts entirely automatically so that the operator need not handle the material at all, but merely insert and carry away the pallets. The use of the pallets, however, is not absolutely necessary, as the blocks could be delivered onto the re-pressing table and removed by hand or in any suitable way. The material is positively forced into the molds so that the latter always receive the same quantity of material. This prevents the formation of undersized blocks or rounded or scant corners, as is liable when the material is merely filled into the molds. The relief mechanisms insure the formation of blocks of uniform size and density, and since said blocks are re-pressed immediately after the molding thereof, and before the bond has time to set or form, this bond is not broken or disturbed after it once forms and a stronger and more perfect block produced. Since the actuating means, namely the cams, for all of the moving parts are formed on the same wheels or other moving bodies, the several operations cannot get out of time, as would be the case if gearing were used for driving the several moving members, as such gearing would wear and the several mechanisms would not operate in exact sequence. The machine operates equally as well upon soft as upon stiff mud or other material, and as its operation is entirely automatic, it dispenses entirely with all hand labor and also produces a better and more uniform product.

The guides 47, tables 10 and 45, and mouth-piece or funnel 12, and mold 11, instead of being formed with horizontal and parallel faces, may be provided with slightly inclined faces, as shown in Fig. 8, in order to form tapered or arch brick.

What I claim is:

1. In a block molding and pressing machine, the combination of a hopper, a movable mold arranged to receive material from the hopper, a molding plunger arranged to force material into the mold, a knife reciprocating between the hopper and mold, a re-pressing plunger, mechanism for actuating said plungers and said knife and for moving the mold from the molding plunger to the re-pressing plunger, said mechanism including cams formed upon a single moving body.

2. In a block molding and pressing machine, the combination of a hopper, a movable mold arranged to receive material from the hopper, a molding plunger arranged to force material into the mold, a feeding plunger arranged to feed material to the molding plunger, a knife operating between the hopper and mold, a re-pressing plunger, and mechanism for moving the mold from the molding plunger to the re-pressing plunger and for actuating said plungers and the knife, said mechanism including an actuating body, common to all said elements.

3. In a block molding machine, the combination of an open bottom mold, a pressing table and plunger, and mechanism for operating said plunger and table so arranged as to advance the table and plunger to press the block, to then lower said table and plunger to eject the block and finally to raise the plunger without lifting the table.

4. In a block molding machine, the combination of an open bottom mold, a pressing table and plunger, and mechanism for operating said pressing plunger and table so arranged as to advance the table and plunger to press the block, then lower the table independently of the plunger, then lower both the table and plunger to eject the block, and finally to raise the plunger.

5. In a block molding and pressing machine, the combination of a movable open bottom mold, a molding table and plunger, a re-pressing table and plunger, mechanism for moving the mold from the molding plunger and table to the re-pressing plunger and table, and mechanism for operating the re-pressing plunger and table so arranged as to lower said table and plunger after the pressing operation to eject the block.

6. In a block molding and pressing machine, the combination of a movable open bottom mold, a molding table and plunger, a re-pressing table and plunger, mechanism for moving the mold from the molding plunger to the re-pressing plunger, and mechanism for operating the re-pressing plunger and table, said last named mechanism being arranged to advance the table and plunger to press the block, then lower the table independently of the plunger, then lower both the table and plunger to eject the block, and finally to raise the plunger.

7. In a block molding and pressing machine, the combination of a mold, mold filling and pressing mechanism, re-pressing mechanism, mechanism for moving the mold from the molding to the re-pressing mechanism, said mold moving mechanism including relief means, and a stop coöperating with said mold.

8. In a block molding and pressing machine, the combination of a mold, mold filling and pressing mechanism, re-pressing mechanism, and mechanism for moving the mold from the molding mechanism to the re-pressing mechanism and return, mold moving mechanism including relief springs, and stops coöperating with said mold.

In testimony whereof, I the said OTTO M. REIF have hereunto set my hand.

OTTO M. REIF.

Witnesses:
MARY D. VOGEL,
F. W. WINTER.